(12) United States Patent
Cheung et al.

(10) Patent No.: US 8,819,763 B1
(45) Date of Patent: Aug. 26, 2014

(54) DYNAMIC ACCESS POLICIES

(75) Inventors: David W. Cheung, Hoboken, NJ (US);
David Van, Somerset, NJ (US)

(73) Assignee: Xceedium, Inc., Herndon, VA (US)

( * ) Notice: Subject to any disclaimer, the term of this patent is extended or adjusted under 35 U.S.C. 154(b) by 1101 days.

(21) Appl. No.: 12/287,263

(22) Filed: Oct. 6, 2008

Related U.S. Application Data

(60) Provisional application No. 60/997,841, filed on Oct. 5, 2007.

(51) Int. Cl.
*G06F 17/00* (2006.01)
*G06F 7/04* (2006.01)

(52) U.S. Cl.
USPC .................................. 726/1; 726/27

(58) Field of Classification Search
CPC ... H04L 63/20; H04L 63/102; H04L 63/0227; G06F 21/6218; G06F 21/604
USPC .............. 726/1, 2, 5, 24, 25, 27, 28
See application file for complete search history.

(56) References Cited

U.S. PATENT DOCUMENTS

| | | | | |
|---|---|---|---|---|
| 6,327,618 B1 * | 12/2001 | Ahlstrom et al. | .......... | 709/223 |
| 6,694,362 B1 * | 2/2004 | Secor et al. | .......... | 709/223 |
| 6,820,069 B1 * | 11/2004 | Kogan et al. | .......... | 706/46 |
| 6,978,376 B2 * | 12/2005 | Giroux et al. | .......... | 713/189 |
| 7,093,231 B2 * | 8/2006 | Nuss | .......... | 717/114 |
| 7,155,534 B1 * | 12/2006 | Meseck et al. | .......... | 709/238 |
| 7,912,804 B1 * | 3/2011 | Talwar et al. | .......... | 706/47 |
| 8,181,220 B2 * | 5/2012 | Gilchrist et al. | .......... | 726/1 |
| 8,209,738 B2 * | 6/2012 | Nicol et al. | .......... | 726/1 |
| 8,561,167 B2 * | 10/2013 | Alperovitch et al. | .......... | 726/13 |
| 8,695,056 B2 * | 4/2014 | Banerjee et al. | .......... | 726/1 |
| 8,726,336 B2 * | 5/2014 | Girsig et al. | .......... | 726/1 |
| 2002/0078361 A1 * | 6/2002 | Giroux et al. | .......... | 713/183 |
| 2002/0087686 A1 * | 7/2002 | Cronk | .......... | 709/225 |
| 2002/0152134 A1 * | 10/2002 | McGlinn | .......... | 705/26 |
| 2003/0115484 A1 * | 6/2003 | Moriconi et al. | .......... | 713/201 |
| 2004/0083386 A1 * | 4/2004 | Marquet et al. | .......... | 713/201 |
| 2005/0038790 A1 * | 2/2005 | Wolthusen | .......... | 707/100 |
| 2005/0172261 A1 * | 8/2005 | Yuknewicz et al. | .......... | 717/106 |
| 2006/0005254 A1 * | 1/2006 | Ross | .......... | 726/27 |
| 2006/0059564 A1 * | 3/2006 | Tan et al. | .......... | 726/27 |
| 2006/0143685 A1 * | 6/2006 | Vasishth et al. | .......... | 726/1 |
| 2006/0191017 A1 * | 8/2006 | Hieda | .......... | 726/27 |
| 2007/0044095 A1 * | 2/2007 | Banerjee | .......... | 717/176 |
| 2007/0094716 A1 * | 4/2007 | Farino et al. | .......... | 726/5 |
| 2007/0199060 A1 * | 8/2007 | Touboul | .......... | 726/11 |
| 2007/0233751 A1 * | 10/2007 | Sampson | .......... | 707/201 |
| 2007/0244940 A1 * | 10/2007 | Devarakonda et al. | .......... | 707/205 |
| 2008/0021918 A1 * | 1/2008 | Rao | .......... | 707/102 |
| 2008/0028389 A1 * | 1/2008 | Genty et al. | .......... | 717/174 |
| 2008/0040364 A1 * | 2/2008 | Li | .......... | 707/100 |
| 2008/0104661 A1 * | 5/2008 | Levin et al. | .......... | 726/1 |
| 2008/0109897 A1 * | 5/2008 | Moran et al. | .......... | 726/19 |
| 2008/0235721 A1 * | 9/2008 | Ismail et al. | .......... | 725/16 |

(Continued)

*Primary Examiner* — Abu Sholeman
(74) *Attorney, Agent, or Firm* — Van Pelt, Yi & James LLP

(57) ABSTRACT

A technique for securely granting access to a target system to a user includes requesting a plurality of security policies from a plurality of distributed policy systems. It further includes obtaining a plurality of security policies from the plurality of distributed policy systems. It further includes granting a temporary grant of access that is an aggregate of the plurality of security policies. It further includes implementing the temporary access grant for the user.

17 Claims, 5 Drawing Sheets

(56) References Cited

U.S. PATENT DOCUMENTS

| | | | |
|---|---|---|---|
| 2008/0301755 A1* | 12/2008 | Sinha et al. | 726/1 |
| 2008/0301765 A1* | 12/2008 | Nicol et al. | 726/1 |
| 2009/0041253 A1* | 2/2009 | Chen et al. | 380/282 |
| 2009/0055397 A1* | 2/2009 | Man et al. | 707/9 |
| 2009/0193492 A1* | 7/2009 | Banerjee et al. | 726/1 |
| 2010/0199346 A1* | 8/2010 | Ling et al. | 726/12 |
| 2010/0332998 A1* | 12/2010 | Sun et al. | 715/757 |
| 2011/0173084 A1* | 7/2011 | Cheng et al. | 705/26.1 |
| 2011/0225417 A1* | 9/2011 | Maharajh et al. | 713/150 |
| 2012/0174180 A1* | 7/2012 | Girsig et al. | 726/1 |
| 2013/0007721 A1* | 1/2013 | Slavin et al. | 717/140 |
| 2013/0066891 A1* | 3/2013 | Boldyrev et al. | 707/755 |
| 2013/0083678 A1* | 4/2013 | Yin | 370/252 |
| 2013/0347125 A1* | 12/2013 | Rezlan et al. | 726/27 |
| 2014/0136545 A1* | 5/2014 | Calo et al. | 707/743 |

\* cited by examiner

DYNAMIC ACCESS POLICIES

CROSS REFERENCE TO OTHER APPLICATIONS

This application claims priority to U.S. Provisional Patent Application No. 60/997,841 entitled DYNAMIC ACCESS POLICIES filed Oct. 5, 2007 which is incorporated herein by reference for all purposes.

BACKGROUND OF THE INVENTION

Entities use a variety of administrators to configure and maintain network resources such as routers and services. In some cases those IT administrators are honest, trustworthy individuals. Unfortunately, in other cases, administrators may have a malicious interest in administering the network. Additionally, when entities use the services of a managed service provider, contractor, or other outside assistance, it may be difficult for the entity to determine the reliability or trustworthiness of an individual before granting that individual access to network resources.

Traditionally, remote access technologies use predefined ("static") user accounts and policies. Unfortunately, static accounts/policies can become stale. And, as companies make increasing use of contractors, off-shore solutions, and other non-permanent/ephemeral employees, the problem is compounded. Additionally, static policies are often over generous in the access they allow (e.g. allowing a contractor access to all 25 servers on an enterprise), creating unnecessary exposure/risk for the enterprise.

BRIEF SUMMARY OF THE INVENTION

A system is configured to request a plurality of security policies from a plurality of distributed policy systems. The system obtains the plurality of security policies from the plurality of distributed policy systems. The system grants a temporary grant of access that is an aggregate of the plurality of security policies. The system implements the temporary access grant is implemented for the user.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
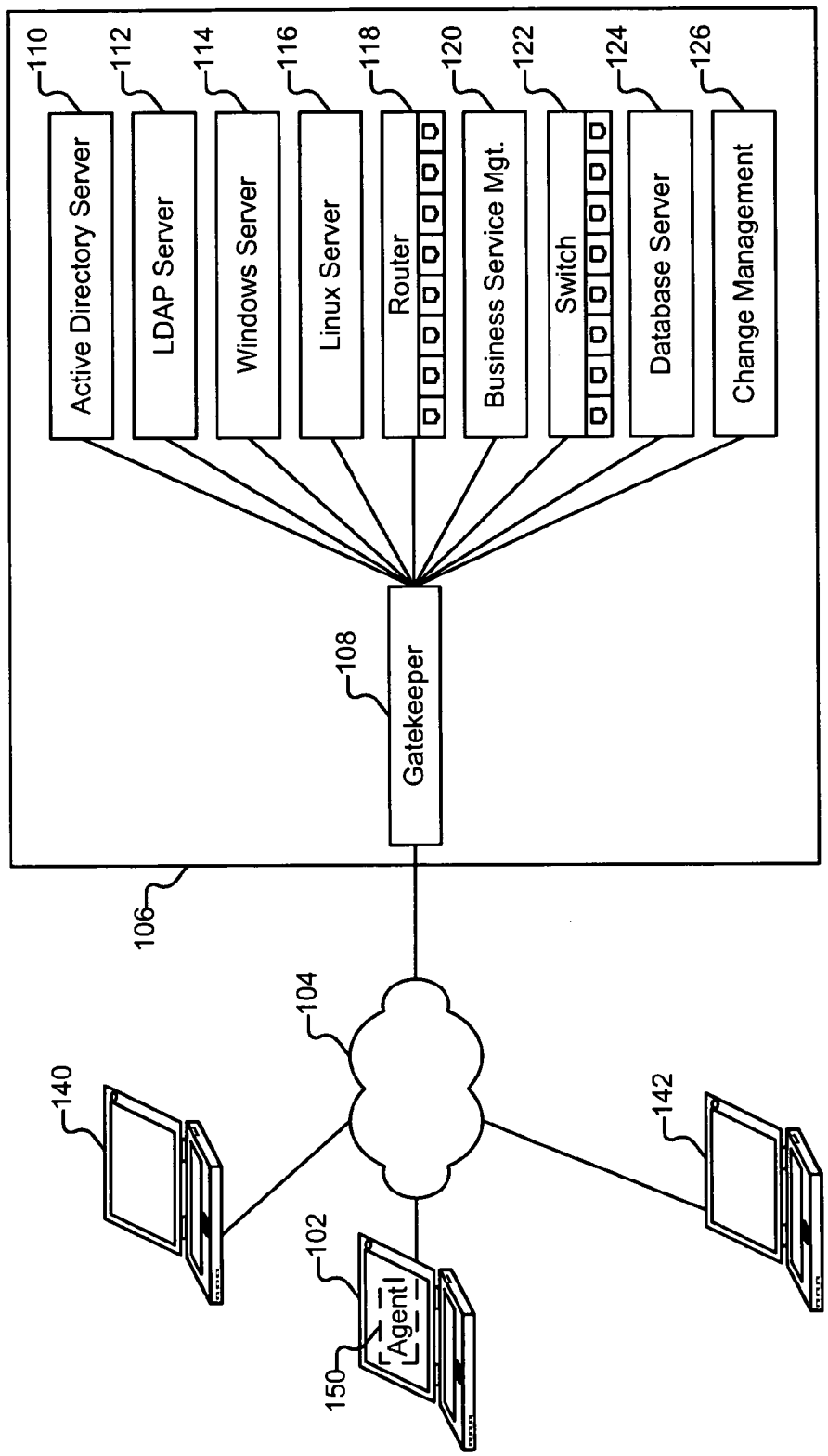
FIG. 1 is a block diagram illustrating an embodiment of an environment having network security.

FIG. 1 is a block diagram illustrating an embodiment of an environment having network security. In the example shown, clients 102, 140, and 142 are used to administer various nodes (also referred to herein as "devices") in an enterprise network. Examples of users of client 102 include in-house engineers/administrators, consultants, vendors, and managed service providers (hereinafter referred to collectively as "administrators"). In some cases, administrators administer entire nodes (such as a file server). In other cases, administers administer subsets of nodes such as by administering particular services without administering other services on the same node. As used herein, the "resources" administered by an administrator refer to the nodes and/or services an administrator is authorized to access. Some of the resources administered may be critical pieces of infrastructure, such as production servers or databases.

Network 106 is an enterprise network belonging to ACME Corporation that includes (among other nodes) an Active Directory server 110, an LDAP server 112, a Windows server 114, a Linux server 116, a router 118, a business service management server 120, a switch 122, a database server 124, and a change management system 126.

In the example shown, a particular administrator (also referred to herein as "Alice") has the responsibility of administering resources on nodes 114 and 116 using her company issued laptop, client 102. Alice does not administer node 124. Alice is a senior network administrator. She assisted in her duties by a junior administrator, Bob (who uses client 140). Bob has the responsibility of assisting Alice with node 114, but is not responsible for assisting with node 116. Client 142 is used by a representative of the manufacturer of router 118 ("Charlie") to administer router 118 and all other routers manufactured by the manufacturer and in use within network 106 (not shown). Charlie is not an employee of ACME Corporation. Instead, ACME Corporation has a contract with the router manufacturer such that the router manufacturer agrees to maintain ACME Corporation's routers in exchange for a monthly fee.

Additional examples of clients include workstations, personal computers, and cellular phones/personal digital assistants (PDAs), as well as other types of information appliances, as applicable. In some embodiments, an agent 150 facilitates communication between client 102 and network 106.

As described in more detail below, Alice can use her client 102 to connect with gatekeeper 108. Alice provides credential information to gatekeeper 108. After authenticating Alice, gatekeeper 108 provides client 102 with instructions that map ports on Alice's laptop with services on the devices she is authorized to administer. Alice is presented an abstracted view of those resources on network 106 to which she is authorized access, and cannot view the resources on that network that she is not authorized to access. Networks 106 may contain hundreds or thousands of nodes. Nonetheless, using the techniques described herein, only the subset of resources Alice is authorized to access will be visible to her. For example, after authenticating to gatekeeper 108 and initiating a session with the gatekeeper, Alice will be able to copy files from Windows server 114 to Linux server 116 by using native tools on her laptop such as the file explorer and/or an scp client. Alice will not be able to see router 118. Bob and Charlie, after connecting to gatekeeper 108, will be able to see nodes 114 and 118, respectively.

Figure 2:
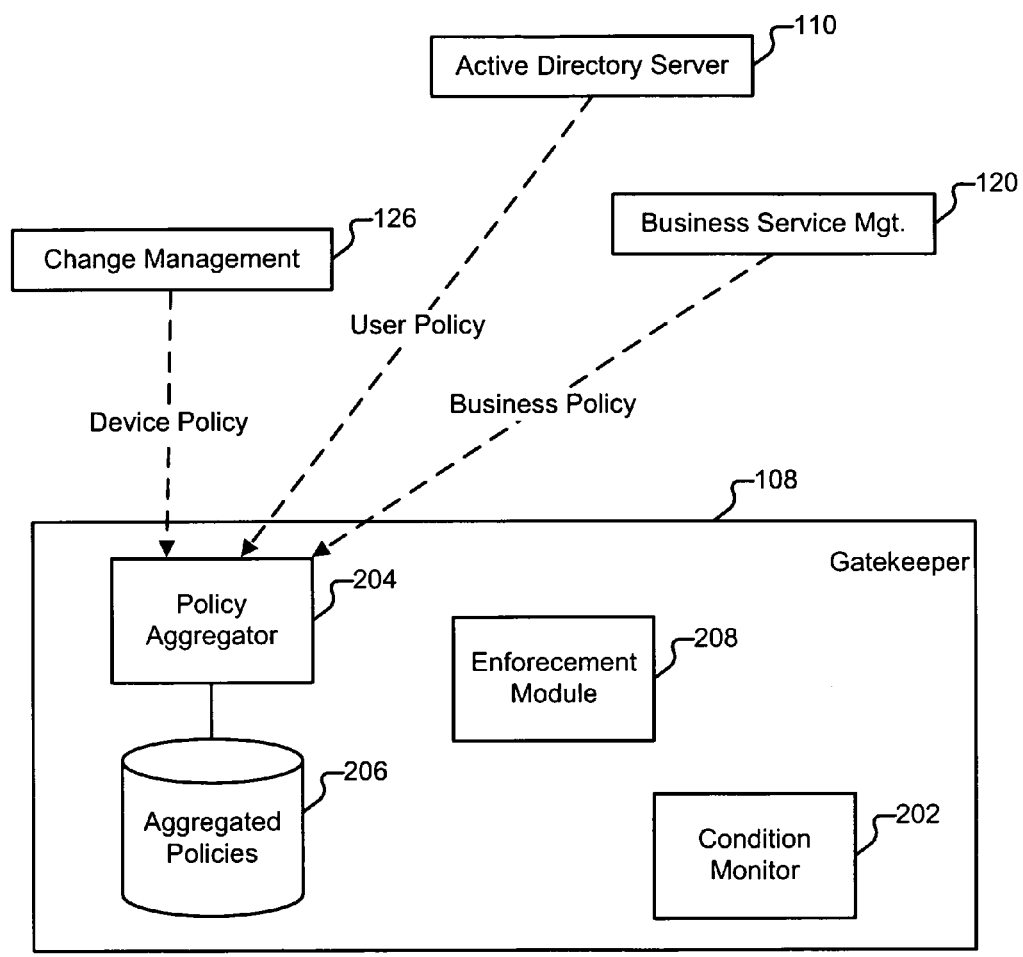
FIG. 2 is a block diagram illustrating an embodiment of a gatekeeper.

FIG. 2 is a block diagram illustrating an embodiment of a gatekeeper. In the example shown, condition monitor 202 is configured to monitor for the occurrence of conditions. When a condition (also referred to herein as a "trigger") occurs, gatekeeper 108 requests security policies (e.g., user, device, and business policies) from assorted policy systems. Gatekeeper 108 is configured (e.g., by an administrator) with a list of policy systems. Policy aggregator 204 aggregates the received policies and stores them in database 206. Enforcement module 208 provides agent 150 with instructions based on applicable policies stored in policy database 206.

In various embodiments, an administrator of gatekeeper 108 configures the conditions for which condition monitor 202 monitors. One example of a condition is a detection that a user—any user—is attempting to establish a connection with gatekeeper 108 (and thus ultimately gain access to one or more resources within network 106). Additional examples of a condition is the provision of an unknown user identification (e.g., one that does not have a record in database 206) by a client, the provision of an incorrect credential by a client, and the elapsing of an amount of time (e.g., an hour or a day), an administrator of gatekeeper 108 making use of a "refresh" button on an administration interface, etc. In various embodiments, gatekeeper 108 synchronizes user credential information with servers such as Active Directory server 110. If client 102 presents an unrecognized (to gatekeeper 108) username and/or credential, gatekeeper 108 can be configured to request current user policy information from Active Directory server 110 to ensure that its copy of the credential information is current.

Yet another example of a trigger condition includes the detection by gatekeeper 108 of a change in a security policy system (or a notification provided to the gatekeeper that such a change has been made). For example, suppose Bob is fired. A representative of the human resources department might, immediately upon Bob's termination, set Bob's status in the Active Directory from active to inactive. The occurrence of such an event can be used as a trigger.

If network 106 includes a help desk and/or trouble ticket software, in some embodiments the receipt of tickets can be used as a trigger. For example, if router 118 fails, an alert might be generated and submitted to the ticket system. The ticket system may automatically (or at the request of an administrator) trigger portions of the process shown in FIG. 3. If router 118 is typically inaccessible for maintenance during business hours, the applicable business rule can be modified by an administrator of business service management server 120, can be overridden by an administrator of gatekeeper 108, can be overridden by an administrator of the ticket system, or any other appropriate action can be taken. For example, in some embodiments the ticket system is an example of a policy server. The ticket system/help desk administrator is likely to know all of the information required to generate a complete policy of the type stored in database 206. Accordingly, in some cases, an administrator of the help desk (or the ticket system itself) can generate a temporary policy that is sent to gatekeeper 108 that includes the identity of the problematic device/service, the individual (e.g., Alice) or group of individuals (e.g., any representative of the router manufacturer) authorized to address the problem, and the time (e.g., one hour, one day) for which the access is authorized. Once the ticket is closed, the policy can be automatically removed so that, for example, while Charlie may be given two hours to correct a problem, if he closes the ticket within the first ten minutes, he may not use the remaining 110 minutes for nefarious purposes.

In some embodiments network 106 includes a monitoring node that is configured to monitor for problems in the network and, upon detection of problems, alert a trouble ticket system and alert gatekeeper 108.

When condition monitor 202 detects the occurrence of a condition, gatekeeper 108 requests the applicable security policies from the policy systems. For example, Gatekeeper 108 requests user policy information from Active Directory server 110 (and LDAP server 112). The user policy information includes information such as a user's user identification (e.g., "alice.jones"), corresponding credentials (such as passwords or password hashes and digital certificates), the groups to which the user belongs, and whether the user is active (e.g., a current employee or contractor) or whether the user is inactive (e.g., a former employee).

Gatekeeper 108 requests device policy information from change management system 126 (and any other applicable systems). The device policy information includes information such as a list of devices (e.g., stored in an asset database), the IP addresses and/or network names of those devices, and the services/protocols made available on those devices (e.g., telnet, FTP, SSH).

Gatekeeper 108 requests business policy information from business service management server 120 (and any other applicable systems). The business policy information includes information such as the times at which assorted resources may be modified. For example, a production web server may be expected to have a high availability and changes may only be made to it between 4 am and 5 am Sunday mornings except in case of emergency. Other servers, such as are used by the finance or human resource departments of ACME Corporation may have more relaxed scheduling constraints, and allow administration to be performed weeknights after 8 pm and all day on weekends. Some resources, such as experimental or test systems may have no time constraints and the corresponding business policies for those systems will indicate this lack of constraint.

In some cases, the assorted policy information may be split across multiple systems. For example, device policy information may be provided by both an asset database (e.g., listing only a device's name and network information) and a service database (e.g., listing the protocols/applications made available by nodes).

Policy aggregator 204 aggregates the received policies and stores them in database 206. In some embodiments, policy database 206 includes four dimensional policies that govern the resources that client 102 is allowed to access. The dimensions are user, time, service, and device. An example policy could be represented in policy database 306 as a row entry of the form (user,time,service,device). Portions of the aggregated policy are determined from each of the respective types of received policies. (E.g., the user portion being supplied by the user policy transmitted by the Active Directory server, and so on.)

One process that policy aggregator 204 can employ for aggregating policies is as follows. First, policy aggregator 204 breaks the received policies up into required parameters such as user, time, service, and device. Next, the parameters are mapped to the applicable store, for example, information from the Active Directory is placed in a user information store, while information from an LDAP server is placed in a device store. Next, the different stores are accessed to retrieve the stored parameters. The information returned is normalized and either stored in memory or temporarily stored in a database. Finally, an access policy to provide to the user when he or she connects is assembled into an access policy.

As mentioned above, Alice is authorized to administer Windows server 114. As a member of the senior network administrator group, she is authorized to access all protocols available on a device to which she has access. Suppose a business policy exists that Windows server 114 may be maintained nightly between ten and midnight. When Alice connects to gatekeeper 108, security policy information is obtained from assorted policy systems. Aggregator 204 evaluates the received information and determines a policy for Alice. Such a policy defining her access rights might be represented in policy database 206 as (alice.jones, 22:00, 23:59, RDP, WindowsServer 114), where alice.jones is Alice's user identifier on the Active Directory server, where 23:00 indicates that she may start using the service at ten in the evening and where 23:59 indicates that her authorization to use the service ends at midnight, where RDP is the connection method that Windows server 114 supports (according to the change management server). An additional policy for Alice might also be created by aggregator 204 with respect to Alice's access to Linux server 116.

In various embodiments, other data structures are used to store and provide access to the information contained in database 206 such as flat files. In the example shown, the information provided by various security policy systems may be normalized by aggregator 204. For example, while there may be many different versions of FTP offered across several different platforms (e.g., FTP for Windows, FTP for Linux, and the assorted versions thereof), there might be only a single "FTP" entry in the policy database 206 that is used to indicate any and all of those particular instances of FTP.

Figure 3:
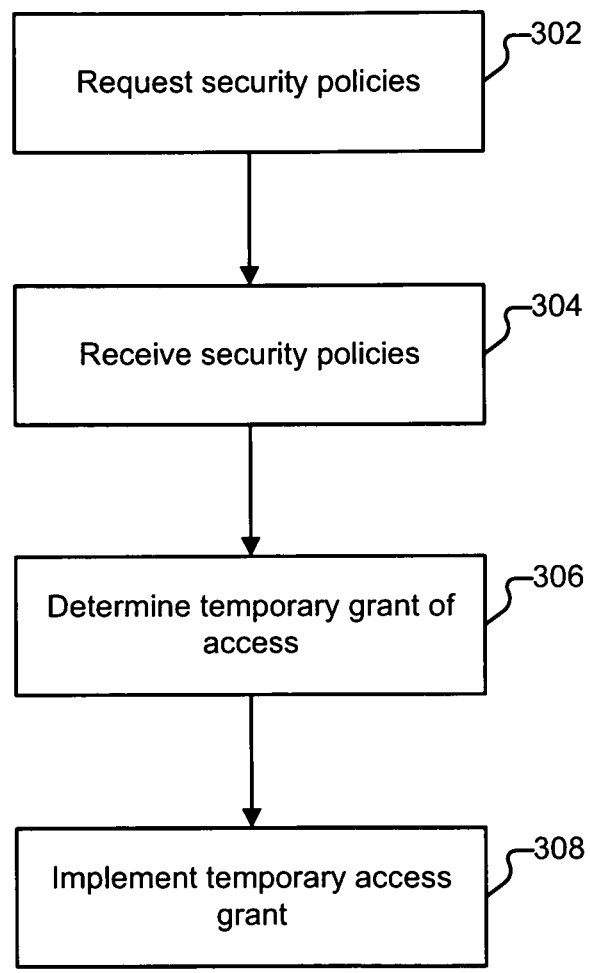
FIG. 3 is a flow chart illustrating an embodiment of a process for securely granting access to a target system to a user.

FIG. 3 is a flow chart illustrating an embodiment of a process for securely granting access to a target system to a user. In some embodiments the process shown in FIG. 3 is performed by gatekeeper 108. The process begins at 302 when one or more security policies are requested. For example, at 302, gatekeeper 108 contacts security policy systems such as Active Directory server 110 and requests a security policy.

At 304, security policies (e.g., as requested at 302) are received. At 306, a temporary grant of access is determined. For example, at 306, policy aggregator 204 aggregates the policies received at 304 and stores them in database 206. At 308, the temporary grant of access is implemented for the user. The implementation of the access grant is described in more detail below. Once the temporary access grant expires, in some embodiments it is removed from database 206. For example, in the scenario in which Alice has a two hour window to perform maintenance, Alice may be able to connect multiple times to Windows server 114 during that two hour period. At midnight, the policy is removed from the database, and if she attempts to connect again, her request will be denied.

Different techniques can be used to address access attempts that are inconsistent with (or not supported by) a policy in database in 206. For example, in some embodiments if Alice is connected to Windows server 114 at 23:58, gatekeeper will continue to allow her to access the resource for an additional hour (or other length of time) but not allow her to open new sessions after midnight. (Additional actions, such as an alert being mailed to an administrator may also be taken.) In other cases, at 23:59, Alice's connection will be terminated. Other actions can also be taken. For example, suppose Charlie attempts to access a router during a time at which access is not permitted due to a business policy. It may be the case that an emergency involving the router has arisen and the default business policy needs to be overridden. One way gatekeeper 108 can permit this is to recognize that Charlie's access attempt is in violation of a policy, and to contact an administrator for authorization to allow him to proceed.

In some embodiments gatekeeper 108 is configured to automatically resolve at least some policy conflicts. For example, change management system 126 is typically associated with planned events, whereas a trouble ticket system is typically used for addressing unplanned problems. Both systems may provide rules to gatekeeper 108 describing when the outside contractor, Charlie, may perform maintenance tasks on routers, and those rules may conflict with one another. Aggregator 204 can be configured to store priority or weighting information (e.g., on a per-source basis) that can be applied to arbitrate the access that will be granted to Charlie when aggregated rules conflict. For example, the trouble ticket system may be assigned a priority of 1 (higher), while change management system 126 may be assigned a priority of 2 (lower). When Charlie attempts to perform routine tasks, he will be constrained by the rules provided by change management system 126 because no additional rules (e.g., from the ticket system) will be active in gatekeeper 108. However, if/when a problem arises and the ticket system sends a rule to gatekeeper 108, that rule will automatically override the rule provided by the change management system because the ticket system has a higher associated priority than the ticket system. (For example, Charlie may continue to be constrained by the rules set forth in change management system 126 with respect to all but the problematic router, while Charlie will have a temporary grant of access to the problematic router until the problem is resolved, irrespective of the time of day.) As mentioned previously, other techniques can also be used to resolve conflicts, such as by alerting an administrator and asking for confirmation prior to granting access.

Figure 4:
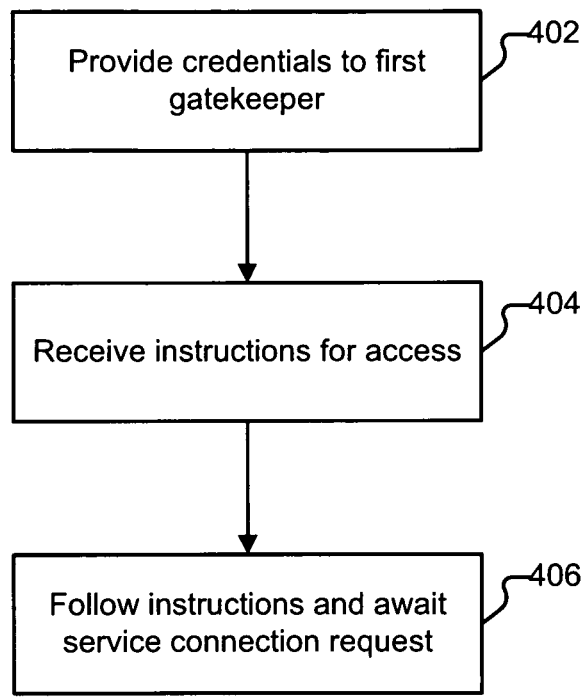
FIG. 4 is a flow chart illustrating an embodiment of a process for establishing a connection with a gatekeeper.

FIG. 4 is a flow chart illustrating an embodiment of a process for establishing a connection with a gatekeeper. In some embodiments the process shown in FIG. 4 is performed by client 102. The process begins at 402 when one or more credentials are provided to the gatekeeper. For example, at 402, client 102 provides credentials to gatekeeper 108. In some embodiments, Alice provides credentials at 402 by starting agent 150 on her laptop, and providing agent 150 with the IP address of gatekeeper 108, and a username and password by which gatekeeper 110 can authenticate her. In various embodiments other authentication techniques are used instead of or in addition to providing a name and a password, such as by requiring Alice to provide a secondary authentication factor or a digital certificate.

Once the credentials sent at 402 are verified, at 404, instructions that indicate how authorized resources can be accessed are received. For example, after validating Alice's credentials, gatekeeper 108 determines the resources to which Alice should be granted access (e.g., via the process shown in FIG. 3) and provides client 102 with instructions for reaching those resources. As described in more detail below, gatekeeper 108 facilitates communication between Alice and the resources during the session with gatekeeper 108. Instructions on port binding/forwarding are examples of the type of information that can be received at 404.

At 406, the agent follows the instructions received at 404 and awaits service connection requests. For example, at 406, client 102 might receive instructions to port forward 127.0.0.1 port 21 to Linux server 114's FTP service, forward 127.0.0.1 port 22 to Linux server 114's SSH service, forward 127.0.0.1 port 23 to Linux server 114's telnet service, etc. Per the received instructions, agent 150 will bind to the local port, set up a listener, and the listener will port forward as appropriate.

In some embodiments, rather than forwarding directly to the appropriate service, agent 150 is instructed to forward localhost to a port on the gatekeeper, which in turn forwards to the appropriate resource. In such a case, a unique identifier is used by the gatekeeper to map the localhost and remote resource to one another. By using this technique, encryption can be used in the communications between client 102 and resources that might typically otherwise be sent in the clear, such as communications sent to an ODBC port. Additionally, the IP address of the resource need not be exposed to client 102. If client 102 is lost or stolen, a nefarious individual attempting to connect to remote resources will be thwarted accordingly.

Figure 5:
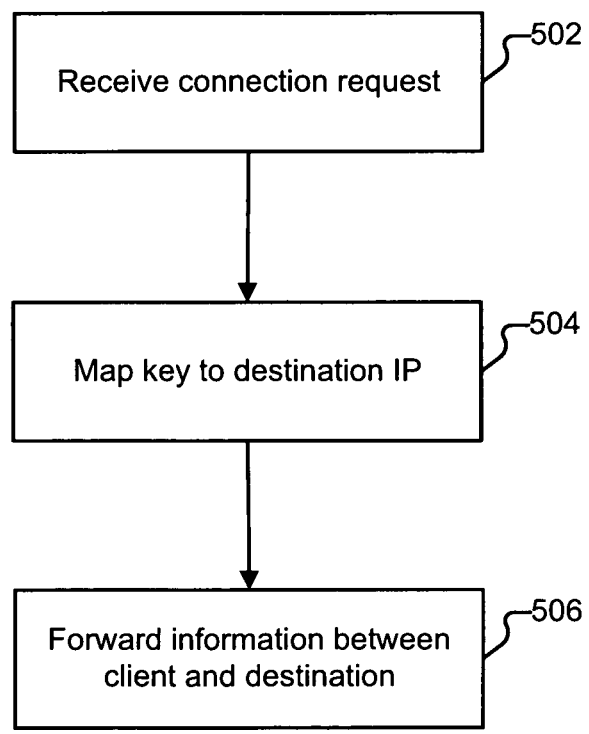
FIG. 5 is a flow chart illustrating an embodiment of a process for communicating information.

FIG. 5 is a flow chart illustrating an embodiment of a process for communicating information. In some embodiments the process shown in FIG. 5 is performed by a gatekeeper such as gatekeeper 108. The process begins at 502 when a request specific to a particular device and service is received. For example, after portion 406 of the process shown in FIG. 4 is performed, agent 150 may observe that a user is attempting to communicate with a particular localhost port. At 502, a connection request is received by gatekeeper 108 accordingly. As applicable, decryption is performed and at 504, the requested resource is mapped to the actual resource. For example, at 504 requests intended for the SSH port of Linux server 116 received by gatekeeper 108 are mapped to the IP address of Linux server 116. At 506, information destined to/from client 102 and the intended destination (e.g., Linux server 116) is bi-directionally forwarded.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for securely granting access to a target system to a user comprising:
    an interface configured to receive an access request;
    a processor; and
    a memory coupled with the processor, wherein the memory is configured to provide the processor with instructions which when executed cause the processor to:
    request a plurality of security policies from a plurality of distributed policy systems,
    wherein the plurality of distributed policy systems includes at least one of a change management system associated with planned events and a ticket system;
    obtain the plurality of security policies from the plurality of distributed policy systems;
    determine a temporary grant of access for the user, wherein the determining includes dynamically generating a temporary, multi-dimensional access policy for the user,
    wherein the multi-dimensional access policy is an aggregate of at least some of the plurality of security policies, and wherein the dynamically generated multi-dimensional access policy governs a set of network resources that the user is permitted to access and includes at least one of an authorized access time and an authorized access protocol;
    implement the determined temporary grant of access for the user;
    determine whether rules associated with the at least some of the plurality of security policies aggregated into the multi-dimensional access policy conflict with at least some of one another when applied in conjunction with implementing the determined temporary grant of access for the user; and
    in the event that rules associated with the at least some of the plurality of security policies aggregated into the multi-dimensional access policy are determined to conflict with at least some of one another when applied in conjunction with implementing the determined temporary grant of access for the user, resolve the conflict.

2. The system of claim 1 wherein the plurality of distributed policy systems include an Active Directory system.

3. The system of claim 1 wherein the plurality of distributed policy systems include a Lightweight Directory Access Protocol system.

4. The system of claim 1 wherein the plurality of distributed policy systems include a business service management system.

5. The system of claim 1 wherein the plurality of security policies includes a user policy.

6. The system of claim 1 wherein the plurality of security policies includes a device policy.

7. The system of claim 1 wherein the plurality of security policies include a business policy.

8. The system of claim 1 wherein the plurality of security policies is requested in response to a detection of a trigger action.

9. The system of claim 8 wherein the trigger action includes a receipt of a user credential.

10. The system of claim 9 wherein the user credential includes a password.

11. The system of claim 9 wherein the user credential includes a user identifier.

12. The system of claim 1 wherein determining a temporary grant includes prioritizing the plurality of security policies.

13. The system of claim 1 wherein the memory is further configured to provide the processor with instructions which when executed cause the processor to contact an administrator.

14. A method of securely granting access to a target system to a user comprising:
    receiving an access request;
    requesting a plurality of security policies from a plurality of distributed policy systems,
    wherein the plurality of distributed policy systems includes at least one of a change management system associated with planned events and a ticket system;

obtaining the plurality of security policies from the plurality of distributed policy systems;

determining, by a computer processor, a temporary grant of access for the user, wherein the determining includes dynamically generating a temporary, multi-dimensional access policy for the user, wherein the multi-dimensional access policy is an aggregate of at least some of the plurality of security policies, and wherein the dynamically generated multi-dimensional access policy governs a set of network resources that the user is permitted to access and includes at least one of an authorized access time and an authorized access protocol;

implementing the determined temporary grant of access for the user;

determining whether rules associated with the at least some of the plurality of security policies aggregated into the multi-dimensional access policy conflict with at least some of one another when applied in conjunction with implementing the determined temporary grant of access for the user; and in the event that rules associated with the at least some of the plurality of security policies aggregated into the multi-dimensional access policy are determined to conflict with at least some of one another when applied in conjunction with implementing the determined temporary grant of access for the user, resolving the conflict.

15. The method of claim 14 wherein the plurality of security policies is requested in response to a detection of a trigger action.

16. The method of claim 15 wherein the trigger action includes an elapse of an amount of time.

17. A computer program product for securely granting access to a target system to a user, the computer program product being embodied in a non-transitory computer readable medium and comprising computer instructions for:

receiving an access request;

requesting a plurality of security policies from a plurality of distributed policy systems, wherein the plurality of distributed policy systems includes at least one of a change management system associated with planned events and a ticket system;

obtaining the plurality of security policies from the plurality of distributed policy systems;

determining a temporary grant of access for the user, wherein the determining includes dynamically generating a temporary, multi-dimensional access policy for the user, wherein the multi-dimensional access policy is an aggregate of at least some of the plurality of security policies, and wherein the dynamically generated multi-dimensional access policy governs a set of network resources that the user is permitted to access and includes at least one of an authorized access time and an authorized access protocol;

implementing the determined temporary grant of access for the user;

determining whether rules associated with the at least some of the plurality of security policies aggregated into the multi-dimensional access policy conflict with at least some of one another when applied in conjunction with implementing the determined temporary grant of access for the user; and in the event that rules associated with the at least some of the plurality of security policies aggregated into the multi-dimensional access policy are determined to conflict with at least some of one another when applied in conjunction with implementing the determined temporary grant of access for the user, resolving the conflict.

* * * * *